April 11, 1950 F. A. MIDDLETON 2,503,505
BABY'S TEAT, FEEDING APPLIANCE,
COMFORTER, OR THE LIKE
Filed July 11, 1947

INVENTOR:
FRANK ALAN MIDDLETON
BY

Patented Apr. 11, 1950

2,503,505

UNITED STATES PATENT OFFICE 2,503,505

BABY'S TEAT, FEEDING APPLIANCE, COMFORTER, OR THE LIKE

Frank Alan Middleton, Cheltenham, England

Application July 11, 1947, Serial No. 760,181
In Great Britain September 4, 1946

3 Claims. (Cl. 128—360)

This invention relates to babies' teats or comforters of the type comprising a mouth piece or nipple and a guard adapted to lie in front of the mouth. It has for its object an improved construction of pneumatic guard which cannot be extended to enter the mouth of the child.

A further object of the invention is a guard which is formed hollow and filled with air so that it forms a pneumatic cushion for bearing against the baby's mouth.

Figure 1:
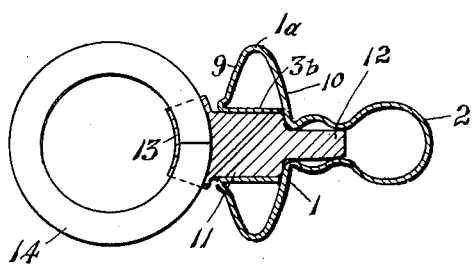
Figure 2:
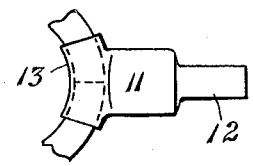

In order that the invention may be clearly understood and readily carried into effect, reference may be had to the accompanying drawings, on which:

Figure 1 is an elevation partly in cross section of a still further modified form, and Figure 2 is a side elevation of a part of the construction shown by Figure 1.

According to one convenient embodiment, the body 1 of the teat comprises an annular or bulbous hollow body 1a on the front of which the nipple or mouth piece 2 projects. The wall of this body is formed of latex or other similar rubber or rubber like material conveniently by a dipping process on a former or by moulding or fashioning in any other desired manner. The rear of the bulbous body 1 is moulded with a tubular extension 3b.

The rear and front walls 9 and 10 of the guard 1a are connected together by a stay or distance piece to retain the hollow guard at a predetermined shape and prevent distortion by stretching for instance and for this purpose tubular extension 3b after moulding is inturned to project into the hollow guard 1a. A cylindrical plug 11 is then passed into the tubular extension to which it is fixed by an adhesive. The plug is provided with an extension 12 which passes into the neck of the teat 2 and the shoulder formed by the parts 11 and 12 is also fixed to the wall of the body of the teat 2 by an adhesive. The rear end of the plug is provided with a tubular head 13 in which the finger ring 14 is mounted. The ring may comprise a straight cylindrical piece of rubber which is bent into a circle and the ends engaged in the tubular head 13 and fixed therein by an adhesive. With the aforedescribed construction the hollow guard 1a has the front and rear walls connected together which prevents the hollow guard collapsing inwardly by stretching. The rear of the hollow body is thus also closed and the hollow body or guard 1a is sealed and filled with air. When the nipple 2 is placed in the baby's mouth, the annular body 1a forming the guard at the base of the teat 2 acts as a pneumatic cushion which will not damage or deform the mouth and which will be more comfortable to the child than a solid guard as it will more readily give to the contour of the mouth.

Having thus described the invention, what is claimed as new and desired to be secured by Letters Patent, is:

1. A baby's teat or comforter comprising a nipple and a guard in the form of a ring or collar at the rear of the nipple characterised in that the wall of the nipple and guard form a shaped hollow body filled with air so that the guard forms a pneumatic cushion for bearing against the baby's mouth, and a stay piece connecting together the front and rear walls of the guard.

2. A baby's teat or comforter comprising a wall of rubber or rubber like material in the shape of a hollow body forming a hollow nipple and a hollow guard filled with air in the form of a pneumatic cushion ring or collar at the rear of the nipple and also a tubular extension at the rear of the guard which extension is inturned into the guard, and a plug fixed in the extension with the said extension and plug connecting together the front and rear walls of the guard.

3. A baby's teat or comforter comprising a wall of rubber or rubber like material in the shape of a hollow body forming a hollow nipple and a hollow guard filled with air in the form of a pneumatic cushion ring or collar at the rear of the nipple and also a tubular extension at the rear of the guard, which extension is inturned into the guard, and a plug fixed in the extension with the said extension and plug connecting together the front and rear walls of the guard, and a finger ring fixed to the plug.

FRANK ALAN MIDDLETON.

REFERENCES CITED

The following references are of record in the file of this patent:

UNITED STATES PATENTS

| Number | Name | Date |
|---|---|---|
| 722,350 | Anderson | Mar. 10, 1903 |

FOREIGN PATENTS

| Number | Country | Date |
|---|---|---|
| 3,666 | Great Britain | Feb. 12, 1913 |
| 501,880 | Great Britain | Mar. 7, 1939 |
| 548,284 | Great Britain | Oct. 5, 1942 |
| 615,494 | France | Oct. 12, 1926 |